UNITED STATES PATENT OFFICE.

JOHN McDOUGALL, OF GREENWICH PARK, ENGLAND.

PROCESS OF MAKING TARTARIC ACID.

No. 898,253.   Specification of Letters Patent.   Patented Sept. 8, 1908.

Application filed February 24, 1908. Serial No. 417,319.

*To all whom it may concern:*

Be it known that I, JOHN McDOUGALL, knight, a subject of the King of Great Britain, residing at Clifton House, Greenwich Park, in the county of Kent, England, have invented certain new and useful Improvements in the Manufacture of Tartaric Acid, of which the following is a specification.

In the manufacture of tartaric acid the acid is converted into its calcium salt which is then decomposed by sulfuric acid. My invention relates to a process whereby this step, with its attendent disadvantages, is avoided. For this purpose I obtain an alkali salt, preferably the potassium salt, of the acid and treat this with sulfuric acid so as to obtain a solution of alkali sulfate and tartaric acid. To this solution I then add a suitable sulfate such as aluminium sulfate, in solid form or as a solution, so as to produce an alum in the solution. The alum is then separated from the tartaric acid by crystallization. I include an ammonium salt and double alkali salts in the term alkali salt. For instance, in treating lees, argol or tartar, sulfuric acid is added to the raw material to convert the potassium bitartrate into potassium sulfate and tartaric acid and what calcium tartrate may be present into calcium sulfate and tartaric acid. The liquid, after separation from any solid matter that may be present, is mixed with aluminium sulfate equivalent to the potassium sulfate that is to say in the proportion for forming alum, and the solution is concentrated to crystallize the alum, as many crystallizations being effected as may be necessary to free the tartaric acid from alum. From the mother liquor tartaric acid is crystallized.

The following example illustrates the invention:—1.75 tons of argol of 71 per cent. strength containing 15.8 per cent. of calcium tartrate, are mixed with 0.4 ton of sulfuric acid of 80 per cent. strength diluted with 10 times its volume of water. The mixture is heated to boiling whereby the whole of the tartrates present become tartaric acid in accordance with the equations:—

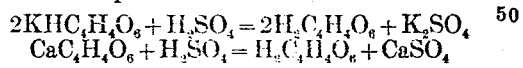

The liquor is now filtered during which operation the temperature should not be allowed to fall below 80° C. so as to prevent the reformation of the sparingly soluble potassium bitartrate. The vegetable matter and the calcium sulfate remain in the filter and to the liquor is added aluminium sulfate in the form say of alum cake, in sufficient quantity to combine with the whole of the potassium sulfate present to form alum, in accordance with the equation:—

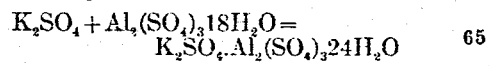

The liquor is now evaporated until its specific gravity is 1.4, whereupon alum crystallizes and is removed; after this the liquor is again concentrated to crystallize out a second crop of the remaining alum. Having thus separated all but traces of the alum the tartaric acid is crystallized and purified by recrystallization while the final mother liquors are worked up in a fresh operation.

Having thus described the nature of this invention and the best means I know of carrying the same into practical effect, I claim:—

In the manufacture of tartaric acid the process which consists in adding to a solution of an alkali salt of the acid, sulfuric acid so as to produce a sulfate of the alkali and tartaric acid, then adding to the solution a suitable sulfate such as aluminium sulfate, so as to produce an alum in the solution, and finally evaporating to crystallize this alum, substantially as described.

In testimony whereof I have signed my name to this specification in the presence of two subscribing witnesses.

JOHN McDOUGALL.

Witnesses:
JOSEPH GILLARD,
WALTER J. SKEETEN.